United States Patent [19]

Bowsky et al.

[11] 4,362,792

[45] Dec. 7, 1982

[54] CONDUCTOR SEAL ASSEMBLY

[75] Inventors: Benjamin Bowsky, Maineville; Allen E. Siegel, Loveland; Richard F. Kerber, Cincinnati, all of Ohio

[73] Assignee: Emerson Electric Co., St. Louis, Mo.

[21] Appl. No.: 211,503

[22] Filed: Dec. 1, 1980

[51] Int. Cl.³ ............................................. H01M 2/30
[52] U.S. Cl. ..................................... 429/181; 429/185; 174/50.61; 174/174
[58] Field of Search .................. 429/181, 174, 185; 174/50.61, 174 GM

[56] References Cited

U.S. PATENT DOCUMENTS

| | | | |
|---|---|---|---|
| 2,138,660 | 11/1938 | Mann | 174/152 GM |
| 2,147,418 | 2/1939 | Bahls | 174/152 GM |
| 3,416,964 | 12/1968 | Michalko | 429/181 |
| 4,049,890 | 9/1977 | Schneider | 429/181 |
| 4,166,158 | 8/1979 | Mead et al. | 429/181 |
| 4,168,351 | 9/1979 | Taylor | 429/181 |
| 4,212,930 | 7/1980 | Athearn | 429/181 |

*Primary Examiner*—Donald L. Walton
*Attorney, Agent, or Firm*—Polster, Polster and Lucchesi

[57] ABSTRACT

In a conductor seal assembly, in which a conductor is sealed in place by a glass seal, a ceramic baffle plug is mounted on, and surrounds the conductor and is sealed at one end to the glass seal, preferably by fusion of the glass seal.

1 Claim, 2 Drawing Figures

CONDUCTOR SEAL ASSEMBLY

BACKGROUND OF THE INVENTION

In applications in which a conductor, such as the terminal pin of a lithium battery, is sealed within a passage in a metal wall, a fluoropolymer sleeve has been crimped onto the conductor to provide more over-surface distance between the conductor and ground and to protect the seal. An example of such an arrangement is to be found in Mead et al U.S. Pat. No. 4,166,158.

One of the objects of this invention is to provide a conductor seal assembly that provides more over-surface distance between the conductor and ground, and protects the seal, in a more economical, simple and effective manner than assemblies known heretofore.

Other objects will become apparent to those skilled in the art in the light of the following description and accompanying drawing.

SUMMARY OF THE INVENTION

In accordance with this invention, generally stated, a conductor seal assembly is provided in which a conductor, passing through a metal wall, is sealed in place by a glass seal and is surrounded by a ceramic baffle plug sealed at one end to the glass seal, and extending along the conductor in a direction away from the seal. Preferably, the baffle plug is sealed to the glass seal by fusion of the glass itself, and the conductor, seal and plug are secured within a metal sleeve, stepped radially intermediate its length to form an external shoulder between a thick-walled section of the sleeve and a relatively thin-walled section, the glass seal being bonded to the inner wall of the sleeve within the thick-walled section, an the ceramic plug, mounted at one end within the thin-walled section.

DESCRIPTION OF THE PREFERRED EMBODIMENT

Figure 1:
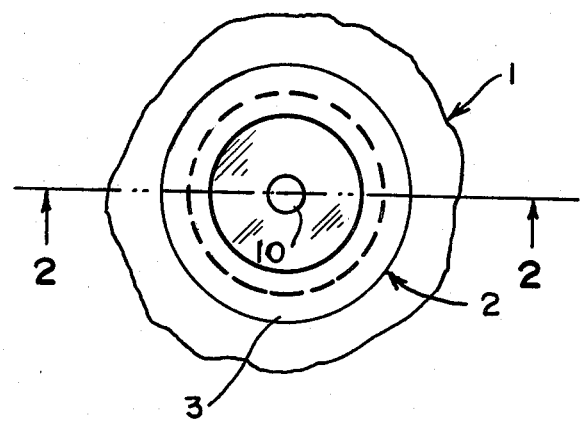
FIG. 1 is a fragmentary top plan view of a conductor seal assembly of this invention welded into a barrier wall.

Referring now to the drawing for one illustrative embodiment of this invention, reference numeral 1 indicates a barrier wall, which can be, for example, the top wall of a battery. A conductor seal assembly in the form of a capsule 2 is secured to the wall 1. The capsule 2 includes a sleeve 3, cylindrical in plan, a conductor 10, shown as coaxial with the cylindrical sleeve 3, a glass seal 15, and a ceramic barrier plug 20.

The sleeve 3 is stepped in its outside surface intermediate its ends to define a shoulder 4 between a thick-walled section 5 and a relatively thin-walled section 6. The wall 1 has in it an aperture 8 of a diameter controlled tightly to embrace the thin-walled section 6. When mounted, the shoulder 4 of the sleeve 3 bears against the outer surface of the wall 1. The sleeve is secured to the wall 1 by a circumferential, hermetic weld 9 in the arris between the undersurface of the wall 1 and the outer surface of the thin-walled section 6. The sleeve 3 has a straight cylindrical bore defined by an inner wall 13.

Figure 2:
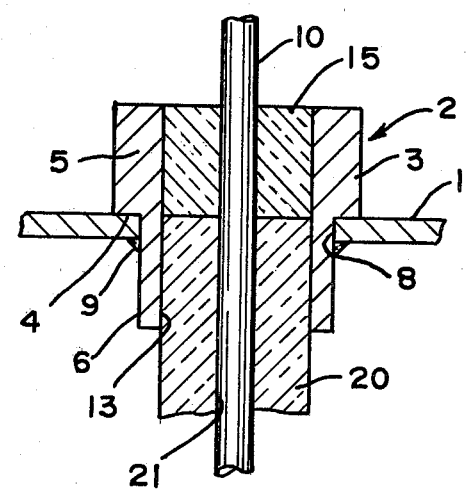
FIG. 2 is a sectional view taken along the line 2—2 of FIG. 1.

The glass seal 15 is fused to and around the conductor 10 and to the inner wall 13 through the height of the thick-walled section 5. The ceramic plug 20 is cylindrical, of an axial length greater than thhe glass seal 15 and of a diameter to fit snugly within the bore 13 through the thin-walled section 6. The plug 20 has a radial surface which abuts the glass seal 15, as shown clearly in FIG. 2. In this embodiment, the plug 20 is bonded to the seal 15 by fusion of the glass seal. The plug 20 has a bore 21, closely embracing conductor 10, and projects from the sleeve 3 any desired distance along the conductor 10.

If the wall 1 is sufficiently thick, the glass seal can be made directly to it. The ceramic plug can be bonded to the glass seal in ways other than by fusion of the glass, as by the use of epoxy, for example, although the fusion is the preferred means. The term ceramic is used to include materials that resemble ceramic in their electrical properties and resistance to corrosion, such as alumina or steatite.

Numerous variations in the construction of the assembly of this invention, within the scope of the appended claims, will occur to those skilled in the art in the light of the foregoing disclosure.

We claim:

1. A pass-through conductor capsule mounted in an external wall of a container, comprising an elongated cylindrical metal sleeve having an axial cylindrical passage through it defined by an inner wall of uniform diameter through its entire length, said sleeve having a thick-walled section and a thin-walled section, defining between them an external step, said thick-walled section projecting outboardly from said container and said thin-walled section extending a substantial distance within the container beyond said wall, an electrical conductor extending through and mounted in said passage, a glass seal bonded to said conductor and to said passage-defining wall wholly within said thick-walled section, and a cylindrical ceramic baffle plug mounted on and around said conductor, of a diameter to fit closely within said passage, one end of said plug being fused to said glass seal, said plug extending through and beyond the end of said passage in said thin-walled section of said sleeve along said conductor, said capsule being welded to said container wall on the inside surface thereof around the outside of said thin-walled section, intermediate the length of the said ceramic plug.

* * * * *